United States Patent [19]
Brumm et al.

[11] 3,942,756
[45] Mar. 9, 1976

[54] EXPANSIBLE TUBE VALVE

[75] Inventors: Richard S. Brumm, Orinda; Gary D. Parola, Moraga, both of Calif.

[73] Assignee: Grove Valve and Regulator Company, Oakland, Calif.

[22] Filed: Oct. 21, 1974

[21] Appl. No.: 516,179

[52] U.S. Cl. .................................. 251/5; 251/61.1
[51] Int. Cl.² .......................................... F16K 7/07
[58] Field of Search ................... 251/4–10, 61.1, 251/331; 137/525

[56] References Cited
UNITED STATES PATENTS

| | | | |
|---|---|---|---|
| 2,622,620 | 12/1952 | Annin | 251/5 |
| 2,941,541 | 6/1960 | Peras | 137/525.1 X |
| 3,836,113 | 9/1974 | Johnson | 251/5 |

FOREIGN PATENTS OR APPLICATIONS 1,202,447  7/1959  France ...................................... 251/5

*Primary Examiner*—Martin P. Schwadron
*Assistant Examiner*—Richard Gerard
*Attorney, Agent, or Firm*—Melvin R. Stidham

[57] ABSTRACT

An expansible tube valve having inlet and outlet body and closures with a generally cylindrical body enclosure between them. A flexible tube embraces a slotted core and integral enlarged beads around the ends of the tube are confined in accommodating annular recesses. Being so confined, the beads serve as retainer means for the tube ends and function also as body seals, being under moderate compression between cylindrical surfaces on the end closures and the interior of the body enclosure.

4 Claims, 3 Drawing Figures

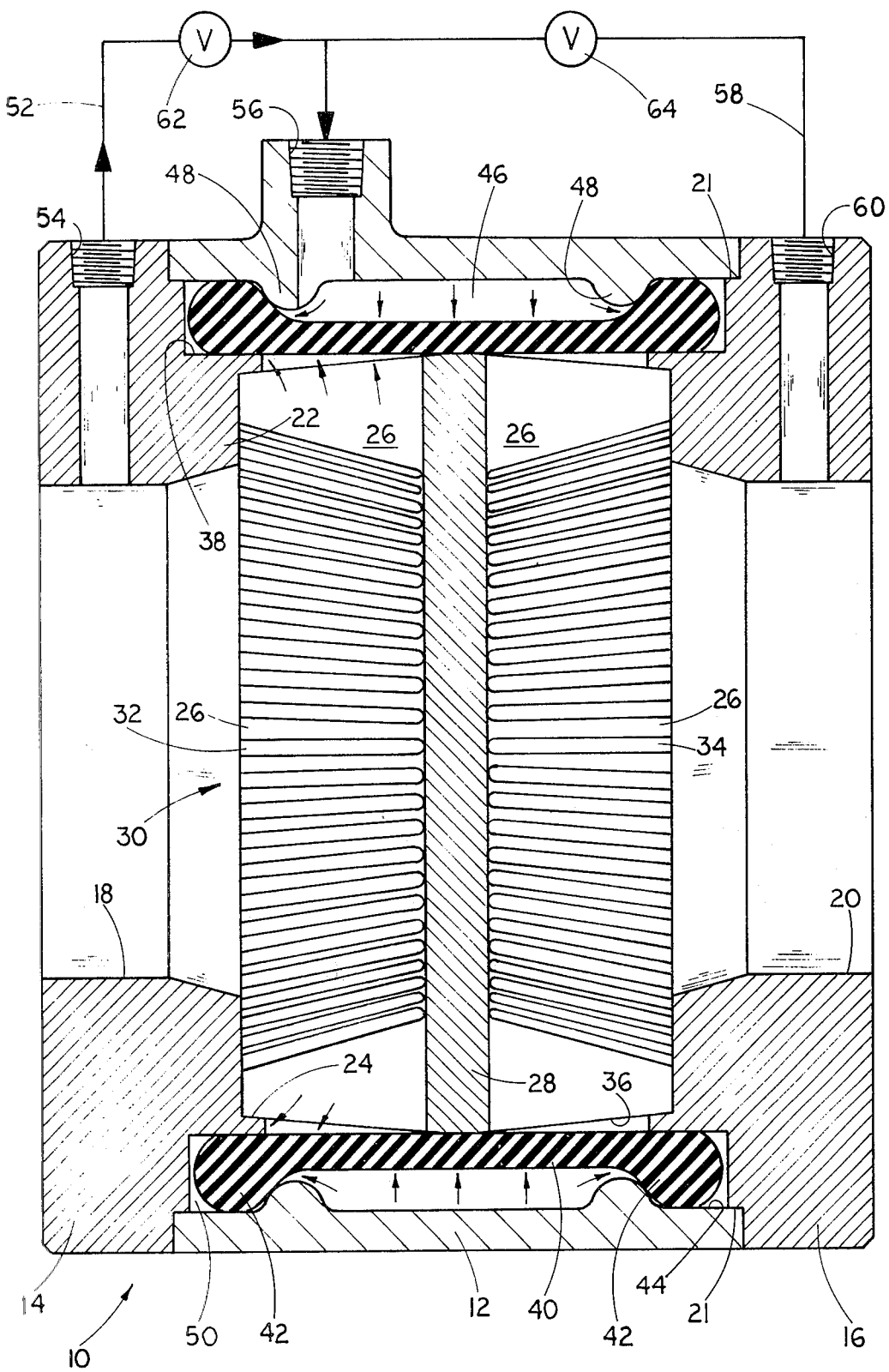
FIG.-1-

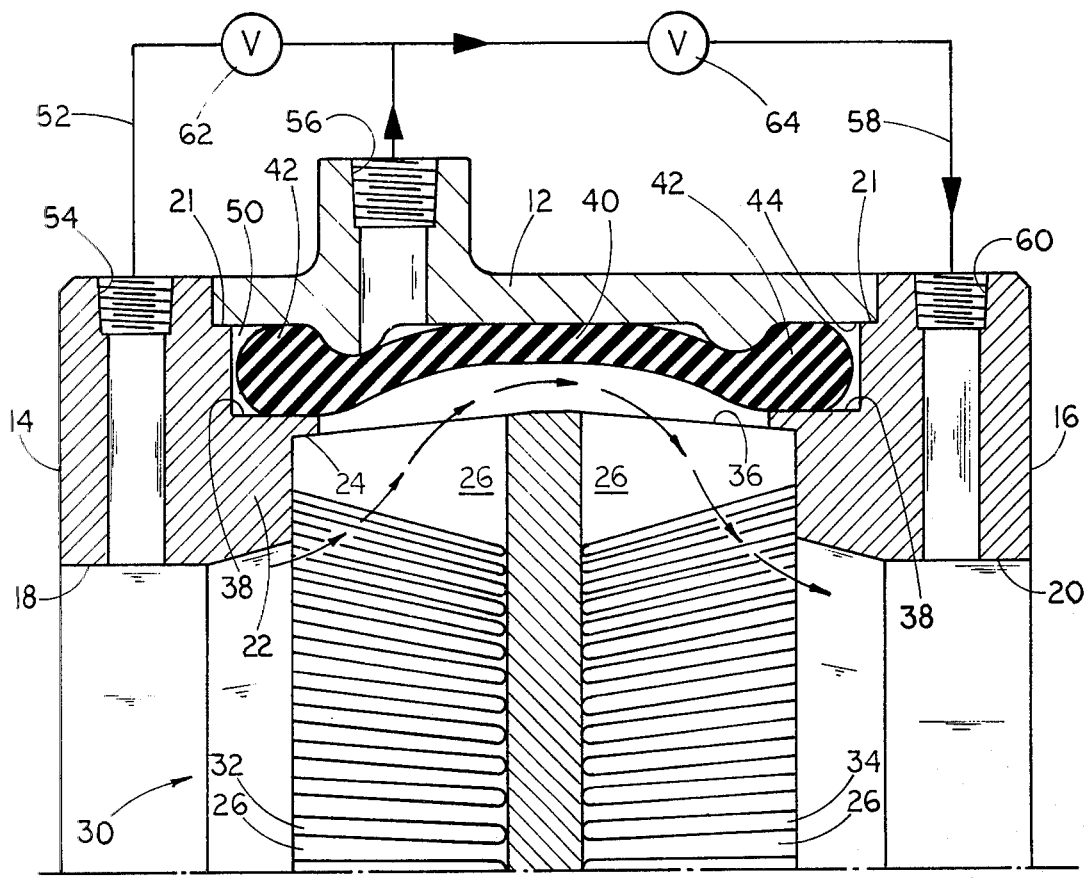
FIG.-2-
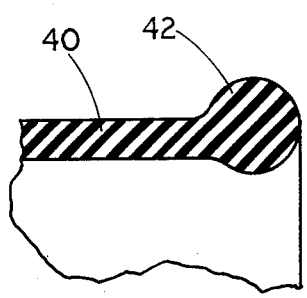
FIG.-3-

# EXPANSIBLE TUBE VALVE

BACKGROUND OF THE INVENTION

Expansible tube valves of the type shown in U.S. Pat. Nos. 3,272,470, 3,371,677, and 3,306,569 have enjoyed considerable commercial success, particularly in pressure regulation service. Such valves include a slotted core with a barrier across it between inlet and outlet flow slots. An expansible tube is stretched to seal around the barrier normally to isolate the inlet and outlet slots. The core and expansible tube are carried within a housing with a jacket fluid pressure normally asserted against the outer surface of the expansible tube. In such valves, the ends of the tube must be firmly anchored in place and must also seal around the core, and between the housing and the end closure. According to the existing configuration, the expansible tubes are provided with integrally molded flange members at the ends thereof, one extending inward and the other extending outward. Because the seal between body parts must be effected over a relatively broad area, i.e. over the flat surface of the flanges, it is necessary to provide an initial high clamping force between the parts so as to insure a fluid-tight seal. Accordingly, a high axial bolt loading is required in assembly of the valve. However, should the loading be excessive, it could produce high stresses in the rubber being squeezed, perhaps causing compression cracking and even failure of the flexible tube and the seal portions thereof. Short of such failure, excessive squeezing of the flanges could produce displacement of the rubber therein, changing the shape of the resilient tube in ways which are difficult to predict and, therefore, difficult to anticipate in design.

OBJECTS OF THE INVENTION

It is an object of this invention to provide an expansible tube valve which does not require individually molded flanges on the ends of the expansible tube for retention and sealing.

It is a further object of this invention to provide an expansible tube valve wherein the tube is not subjected to excessive squeezing stresses for retention and sealing.

It is further object of this invention to provide an expansible tube valve wherein expansible tube ends may be retained without excessive squeezing.

It is further object of this invention to provide an expansible tube valve wherein the expansible tube ends may provide seals without being subjected to excessive squeezing forces.

It is a further object of this invention to provide an expansible tube valve wherein the tube may be retained without squeezing and can seal under modest compressive forces.

It is a further object of this invention to provide an expansible tube valve wherein an expansible tube is carried on a core, which is configurated to facilitate placement of the expansible tube.

Other objects and advantages of this invention will become apparent from the description to follow when read in conjunction with the accompanying drawing.

BRIEF SUMMARY OF THE INVENTION

In carrying out this invention, there is provided a cylindrical core having a central barrier across it and two annular series of inlet and outlet flow slots enabling fluid flow around the barrier. The ends of the core are seated in circular receptacles in the body end closures, between which is also clamped a body tube enclsoure. Cylindrical bosses extend inwardly from the end closures surrounding the flow passages therethrough, and the flexible, expansible tube is carried on the core and the cylindrical bosses. The expansible tube has enlarged lips or beads around the ends thereof and, in assembly, the beads are placed under moderate radial compression between the cylindrical bosses on which they are carried and the surrounding body tube enclosure, Hence, the circular enlargements or beads form O-ring type seals between the end closures and the body tube to render the structure fluid-tight. A pair of inwardly extending shoulders or ridges around the inside of the body tube partially close the spaces between the body tube and the bosses to form an annular recess or gland for the o-ring type bead seal. These internal ridges are engagable by the beads to restrain them against axial movement towards the barrier and, hence, the inwardly extending ridges and beads function together as restraining means for the ends of the flexible tube.

BRIEF SUMMARY OF THE DRAWINGS

In the drawing:

FIG. 1 is a vertical section view of an expansible tube valve embodying features of this invention;

FIG. 2 is a partial vertical section view of the expansible valve in open condition; and FIG. 3 is a partial section view of an end of the expansible tube showing the sealing and retaining means.

DESCRIPTION OF A PREFERRED EMBODIMENT

The flexible tube valve 10 of this invention comprises an outer, generally cylindrical body tube 12 which may be clamped by any suitable means (Not Shown) between upstream and downstream end closures 14 and 16 having inlet 18 and outlet 20 flow passageways therethrough. The end closures 14 and 16 preferably have shoulders 21 formed therein to seat the body tube closure 12 and have circular bosses 22 protruding axially inward from the interior surfaces thereof. In the faces of the bosses 22 are formed circular recesses 24 in which are seated the annular array of fingers 26 protruding from the central barrier 28 of the cylindrical core 30.

The axially extending fingers 26 of the core 36 may be integrally formed with the barrier 28 and are circumferentially spaced to form inflow 32 and outflow 34 slots therebetween. The core may be die cast in a single piece and, to facilitate removal from the mold, the core sleeve fingers 26 are preferably tapered inwardly at 36 from the central barrier 28 to the ends thereof which are seated in the recesses 24 and thereby restrained against outward deflection.

Stretched over and around the central barrier 28 with its ends carried on the cylindrical surfaces 38 of the end closure bosses 22 is the flexible expansible tube 40. With the tube firmly engaged around the barrier 28, flow is blocked from the inlet slots 32 to the outlet slots 34 and, hence, the flexible tube valve 10 is closed to fluid flow. However, when the tube is expanded away from the barrier as shown in FIG. 2, flow is enabled in the direction of the arrows from the upstream passage 18 through the slots 32 between the upstream fingers 26 and around the barrier 28 to the downstream passage."

Formed on the ends of the flexible tube 40 are enlarged beads or lips 42 of generally circular cross-section in the nature of integral O-ring addenda. The beads are stretched around the cylindrical surfaces 38 on the end closure bosses and are placed under moderate radial compression between such cylindrical surfaces 38 and the inner cylindrical surface 44 of the surrounding body tube enclosure 12, whereby a seal is effected across the space between the bosses 22 and the body tube 12. Hence, pressure asserted against the flexible tube 40, as indicated by the arrows in FIG. 1, is transmitted through the rubber of the circular lips 42, in the fashion of O-ring seals, to effect seals between the end closures 14 and 17 and the body tube 12, and render the structure fluid-tight.

As shown in FIG. 2, when the pressure in the control jacket 46 around the flexible tube 40 is overcome by upstream pressure, the tube 40 is expanded outward against the inner surface 44 of the body tube 12. This tends to draw the ends 42 of the flexible tube 40 axially inward toward the barrier 28. However, there are provided around the inside 44 of the body tube 12, a pair of annular ridges or internal shoulders 48 inwardly adjacent each of the circular beads 42, partially to close the space between the body tube 12 and the cylindrical bosses 22 to form annular recesses or glands 50 within which the O-ring type beads 42 are confined. Hence, if the lips are drawn axially inward as shown in FIG. 2, they engage the annular ridges 48 to limit axial movement thereof. This retains the sealing beads 42 on the cylindrical bosses 22 and maintains the seals between the bosses 22 and the surrounding body tube 12.

As shown in FIG. 3, the beads or lips 42 around the ends of the flexible tube are of generally circular cross-section to constitute a toroidal type O-ring seal around the ends of the flexible tube 40, functioning both as retaining means and as body seals. In assembly, placement of the flexible tube 40 on the core sleeve 30 is greatly facilitated by the tapers 36 on the outer surfaces of the fingers 26.

In place in a pipeline, a pilot fluid load duct 52 is connected from a fitting 54 in the upstream end closure 14 to a second fitting 56 in the body tube enclosure 12. Similarly, an unloading duct 58 is connected from the jacket fitting 56 to a fitting 60 in the downstream end closure 16. Jacket loading and dumping valves 62 and 64 are interposed in the loading duct 52 and unloading duct 58, respectfully. In normal operation, the dumping valve 64 is closed and the loading valve 62 is open, whereby the upstream passage 18 is in the communication, through duct 52, with the pilot jacket 46 to equalize the pressure which is acting against the inside of the flexible tube 40 through the upstream slots 32. Since the tube is under moderate hoop tension around the barrier 28, a seal will be maintained as long as the pressure in the jacket and in the upstream passage 18 continue to be in balance.

When the flexible tube valve of this invention is to be opened, the load valve 62 is closed and the dumping valve 64 is opened, whereby pressure from the jacket 46 is evacuated into the downstream line 20 through the fitting 60 in the downstream end closure 16. With the pressure in the jacket 46 now at downstream pressure, the upstream pressure acting through the slots 32 easily overcomes it and expands the flexible tube 40 to the position shown in FIG. 2 whereby flow is enabled through the upstream slots 32 and around the barrier 28 in through the downstream slots 34 and then out through the outflow passage 20. The radial outward expansion of the tube tends to draw the beaded end seals 42 of the tube axially inward in opposition to the internal pressure forcing them outward. However, any such axial inward movement is restrained by the annular ridges 48, and the beads are maintained under moderate compression between the cylindrical surfaces 38 of the bosses and the inner cylindrical surface 44 of the body tube 12. Hence, fluid-tight seals are maintained between the end closures 14 and 16 and the body tube 12.

While this invention has been described in conjunction with a preferred embodiment thereof, it is obvious that modifications and changes thereof may be made by those skilled in the art without departing from the spirit and scope of this invention, as defined by the claims appended hereto.

What is claimed as invention is:

1. An expansible tube valve comprising:
    inlet and outlet body end members, each with a flow passage therethrough;
    a core of circular cross-section between said end members with opposite open ends thereof aligned with said flow passages;
    said core having two axially spaced series of inlet and outlet through openings therearound, a barrier thereacross intermediate said through openings, and a sealing surface around said barrier;
    an elastomeric expansible tube on said core having an intermediate sealing portion normally snuggly embracing said sealing surface to block flow and responsive to fluid pressure differential in said flow passages and exterior said elastomeric tube to control flow through said valve; and
    a generally cylindrical body tube between said end members around said core and expansible tube;
    the improvement comprising:
    generally cylindrical bosses on said end members around said flow passages projecting inward toward said barrier; and
    an enlarged bead of generally circular cross-section formed on each end of said expansible tube normally moderately compressed radially of said expansible tube between said bosses and said body tube to seal around said tube ends; and
    means restricting movement of said tube ends axially inward toward said barrier to retain said beads on said bosses.

2. The expansible tube valve defined by claim 1 wherein said last-named means comprises:
    a pair of internal shoulders in said body tube displaced from the ends thereof to form an annular chamber for said enlarged beads, said shoulders being engagable by said beads to restrict axial inward movement of said expansible tube ends.

3. The expansible tube valve defined by Claim 1 including: circular recesses in said bosses in which the ends of said core are seated.

4. The expansible tube valve defined by claim 1 wherein:
    the outer peripheral surface of said core is tapered inwardly toward the flow axis from said barrier to ends of smaller diameters.

* * * * *